Feb. 22, 1949.  W. T. WALLER  2,462,147
SPOT FACING JIG
Filed Dec. 10, 1945

INVENTOR.
William T. Waller
BY M. C. Hayes

ATTORNEY

Patented Feb. 22, 1949

2,462,147

UNITED STATES PATENT OFFICE 2,462,147

SPOT FACING JIG

William T. Waller, Philadelphia, Pa.

Application December 10, 1945, Serial No. 634,133

3 Claims. (Cl. 90—12)

(Granted under the act of March 3, 1883, as amended April 30, 1928; 370 O. G. 757)

This invention relates to a jig for performing spot-facing operations.

An object of this invention is to provide a jig for performing spot-facing operations which is portable, simple in construction, and easy to operate.

Another object is to provide a spot-facing jig which can be used so that the depth of cut can readily be ascertained.

Figure 1:
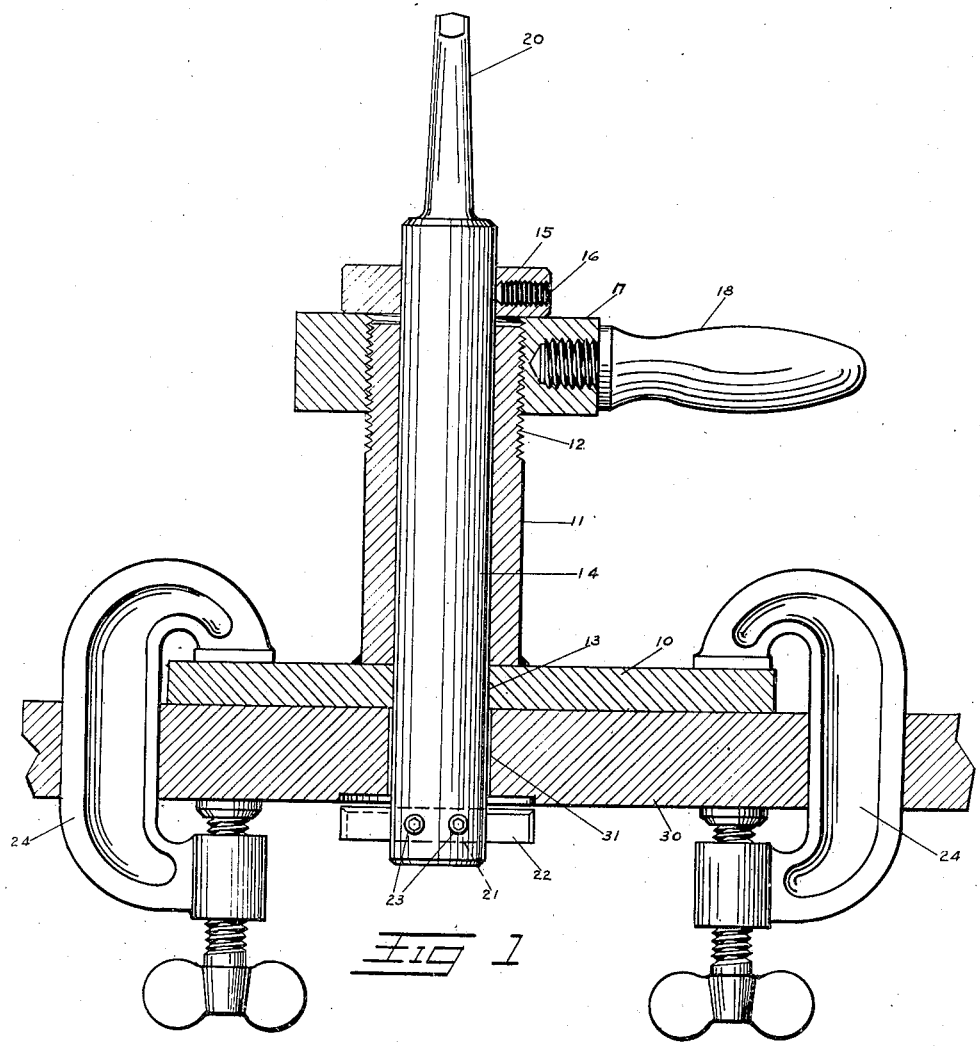
Figure 2:
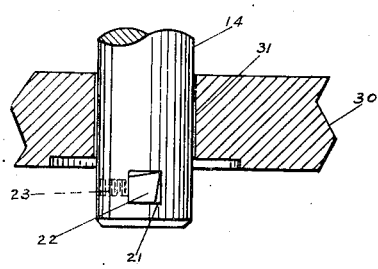

Further objects and advantages of this invention, as well as its construction, arrangement and operation, will be apparent from the following description and claims in connection with the accompanying drawings, in which Fig. 1 is a cross-sectional elevation of the spot-facing jig, through the longitudinal center-plane thereof, and Fig. 2 is a partial view showing one end of the rotary spindle and spot-face cutter.

The drawings illustrate a preferred embodiment of the invention. The jig comprises the base 10 in the form of a flat plate. Attached to the plate, as by welding, and normal thereto is a sleeve 11 which is threaded at its upper end as at 12. A circular aperture 13 is provided in the plate 10 for the reception of a spindle 14 which in turn is also located in the sleeve 11. Attached to the spindle 14 adjacent the free end of sleeve 11 is a collar 15 of a diameter larger than the sleeve 11. Collar 15 is fixed to spindle 14 by a set screw 16. Threaded on the sleeve 11 is a nut 17 which has a handle 18.

One end of the spindle 14 has a tapered shank 20 for connection to a portable air motor or other power source, while the other end of the spindle 14 has a slot 21 which receives a spot-face cutter 22, the cutter 22 being held rigidly in place by means of set screws 23.

In the operation of the device the plate 10 is clamped to the work 30 by means of clamps 24 and the spindle 14 inserted into the sleeve 11, aperture 13 and the bore 31 of the work 30. The collar 15 is then fixed to the spindle 14 at a suitable position by means of the set screw 16. The cutter 22 is then inserted into the slot 21 and fixed into position by means of the set screws 23. Finally the air motor or other power source is connected to the spindle 14 at 20. With the spindle 14 rotating, the handle 18 is used to rotate the nut 17 which thereby exerts a force on the collar 15 which in turn moves the spindle 14 normal to the work 30 and forces the cutter 22 against the work 30. The depth of cut may be readily ascertained by measuring the distance between the plate 10 and the nut 17.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A jig comprising a support, the support being apertured, a journal on the support, a spindle within the aperture of the support and journal, an adjustable stop on the spindle, screw threads on said journal, and a nut operable cooperatively therewith to move said stop and spindle longitudinally in the journal.

2. A jig comprising a support, an aperture in the support, a sleeve on the support in registry with the aperture, a spindle in the sleeve and aperture, a collar on the spindle adjacent one end of the sleeve, the sleeve being threaded, a nut on the threaded sleeve in abutting engagement with the collar, and a handle on the nut.

3. A jig comprising a flat plate, an aperture in the plate, a sleeve fixed to the plate and normal thereto, the sleeve being threaded on its exterior surface, a spindle in the sleeve and aperture and extending beyond both, a collar of larger diameter than the sleeve on the spindle and adjacent to the sleeve, a set screw in the collar for fixing it to the spindle, a nut threaded on the sleeve, a handle on the nut, the nut engaging the collar, whereby when the nut is rotated on the spindle it will move correspondingly, the spindle having a transverse slot at one end thereof, a cutting tool in the slot, a set screw in the spindle for holding the cutting tool in the slot, the other end of the spindle being constructed and arranged for connection to a power source.

WILLIAM T. WALLER.

REFERENCES CITED

The following references are of record in the file of this patent:

UNITED STATES PATENTS

| Number | Name | Date |
| --- | --- | --- |
| 1,570,042 | Clay | Jan. 19, 1926 |